United States Patent
Sakalanaga et al.

(10) Patent No.: US 11,036,532 B2
(45) Date of Patent: Jun. 15, 2021

(54) FAST JOIN AND LEAVE VIRTUAL NETWORK

(71) Applicant: Microsoft Technology Licensing, LLC, Redmond, WA (US)

(72) Inventors: Sarvesh Sakalanaga, Bellevue, WA (US); Raghav Mohan, Seattle, WA (US); Ashish Bhargava, Bellevue, WA (US); Vishal Taneja, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 129 days.

(21) Appl. No.: 15/826,638

(22) Filed: Nov. 29, 2017

(65) Prior Publication Data
US 2019/0163511 A1 May 30, 2019

(51) Int. Cl.
*G06F 9/455* (2018.01)
*G06F 9/54* (2006.01)
*G06F 9/50* (2006.01)

(52) U.S. Cl.
CPC ........ *G06F 9/45558* (2013.01); *G06F 9/5027* (2013.01); *G06F 9/54* (2013.01); *G06F 2009/45595* (2013.01)

(58) Field of Classification Search
CPC ...... G06F 9/44; G06F 9/45558; G06F 9/5027; G06F 9/54; G06F 2009/45595
See application file for complete search history.

(56) References Cited

U.S. PATENT DOCUMENTS 7,500,069 B2* 3/2009 Hochmuth .......... H04L 63/0272
711/152
7,945,640 B1* 5/2011 VanTine ................ G06F 3/0605
709/217

(Continued)

FOREIGN PATENT DOCUMENTS

EP 3072263 A1 9/2016

OTHER PUBLICATIONS

"International Search Report and Written Opinion Issued in PCT Application No. PCT/US2018/062361", dated Feb. 28, 2019, 13 Pages.

(Continued)

*Primary Examiner* — Douglas M Slachta

(57) ABSTRACT

A system includes a processor executing instructions from a computer-readable storage medium. The instructions include, in response to receiving a job request that identifies a first tenant, obtaining a first virtual network key (VNK) corresponding to the first tenant. The instructions include identifying a first computing system that has resources available to satisfy the job request. The instructions include transmitting a first command to the first computing system. The first command includes the first VNK, instructs the first computing system to assign a virtual machine to the job request, and associates the first VNK with the assigned virtual machine. The instructions include, in response to completion of the job request, transmitting a second command to the first computing system. The second command instructs the first computing system to associate a default VNK with the assigned virtual machine. The default VNK does not correspond to the first tenant.

20 Claims, 10 Drawing Sheets

(56) References Cited

U.S. PATENT DOCUMENTS

| | | | | |
|---|---|---|---|---|
| 8,307,362 | B1* | 11/2012 | Gong | G06F 9/5077 718/1 |
| 8,769,644 | B1* | 7/2014 | Eicken | H04L 67/1097 709/225 |
| 8,776,050 | B2* | 7/2014 | Plouffe | G06F 9/45537 718/1 |
| 8,909,928 | B2* | 12/2014 | Ahmad | G06F 21/57 713/168 |
| 9,003,411 | B2* | 4/2015 | Wilson | G06F 9/4401 718/100 |
| 9,014,184 | B2* | 4/2015 | Iwata | H04L 12/4666 370/389 |
| 9,124,633 | B1* | 9/2015 | Eizadi | G06F 9/45558 |
| 9,304,798 | B2* | 4/2016 | Mudigonda | H04L 67/1095 |
| 9,397,886 | B2* | 7/2016 | Yasuda | H04L 41/0813 |
| 9,628,334 | B2* | 4/2017 | Di Benedetto | H04L 41/0816 |
| 9,999,030 | B2* | 6/2018 | Gu | H04L 67/1095 |
| 10,069,680 | B1* | 9/2018 | Wylie | G06F 9/45558 |
| 10,116,732 | B1* | 10/2018 | Canton | H04L 41/0813 |
| 10,129,201 | B2* | 11/2018 | Sagiraju | H04L 61/20 |
| 10,432,581 | B2* | 10/2019 | Field | H04L 67/2838 |
| 2008/0133486 | A1* | 6/2008 | Fitzgerald | G06F 9/5077 |
| 2011/0004918 | A1* | 1/2011 | Chow | H04L 63/08 726/3 |
| 2011/0314163 | A1* | 12/2011 | Borins | H04W 4/08 709/227 |
| 2012/0036236 | A1* | 2/2012 | Richardson | H04L 12/66 709/220 |
| 2013/0054830 | A1* | 2/2013 | Nguyen | H04L 45/02 709/238 |
| 2013/0111549 | A1* | 5/2013 | Sowatskey | H04L 63/08 726/3 |
| 2013/0179894 | A1* | 7/2013 | Calder | G06F 9/5027 718/104 |
| 2013/0179895 | A1* | 7/2013 | Calder | G06F 9/5077 718/104 |
| 2013/0275744 | A1* | 10/2013 | Resch | H04L 63/0428 713/150 |
| 2013/0346987 | A1* | 12/2013 | Raney | G06F 9/5044 718/102 |
| 2014/0025816 | A1* | 1/2014 | Otani | G06F 9/5072 709/225 |
| 2014/0201374 | A1* | 7/2014 | Ashwood-Smith | H04L 49/70 709/226 |
| 2015/0039891 | A1* | 2/2015 | Ignatchenko | G06F 21/53 713/171 |
| 2015/0113529 | A1* | 4/2015 | Zhong | G06F 9/5033 718/1 |
| 2015/0120928 | A1 | 4/2015 | Gummaraju et al. | |
| 2015/0134965 | A1* | 5/2015 | Morenius | G06F 21/57 713/172 |
| 2015/0172331 | A1* | 6/2015 | Raman | H04L 45/586 709/204 |
| 2015/0244617 | A1* | 8/2015 | Nakil | H04L 41/0631 709/224 |
| 2015/0378769 | A1* | 12/2015 | Buck | G06F 9/5072 718/1 |
| 2015/0379277 | A1* | 12/2015 | Thota | G06F 9/45558 713/189 |
| 2016/0103695 | A1* | 4/2016 | Udupi | H04L 47/78 718/1 |
| 2016/0119450 | A1* | 4/2016 | Khasnabish | H04L 69/18 709/224 |
| 2016/0149877 | A1* | 5/2016 | Kancharla | H04L 9/3234 713/171 |
| 2017/0019387 | A1* | 1/2017 | Ylonen | H04L 61/1523 |
| 2017/0093903 | A1 | 3/2017 | Sakalanaga et al. | |
| 2017/0170988 | A1* | 6/2017 | Mazarick | H04L 41/22 |
| 2017/0171144 | A1* | 6/2017 | Sagiraju | G06F 16/00 |
| 2017/0222981 | A1* | 8/2017 | Srivastav | H04L 63/0428 |
| 2018/0046823 | A1* | 2/2018 | Durham | G06F 21/53 |
| 2018/0329730 | A1* | 11/2018 | Bansal | G06F 9/455 |

OTHER PUBLICATIONS

Farinacci, D. et al.; Generic Routing Encapsulation (GRE); Network Working Group; Mar. 2000; 9 pages.

Dommety, G.; Key and Sequence Number Extensions to GRE; Network Working Group; Sep. 2000; 7 pages.

NVGRE, VXLAN and what Microsoft is Doing Right; Tales of the Network Reformation; Network Heresy; Oct. 3, 2011; 5 pages.

Bellavance, Ned; VXLAN and NVGRE; Anexinet Insights; Anexinet; Jul. 25, 2013; 10 pages.

Create Security Policies with Extended Port Access Control Lists for Windows Server 2012 R2; TechNet; Aug. 7, 2013; 7 pages.

Microsoft Network Driver Design Guide; Microsoft; 2017; pp. 1-38, 1265-1274, and 1554-1592.

Garg, P. et al.; NVGRE: Network Virtualization using Generic Routing Encapsulation; Sep. 2015; 17 pages.

* cited by examiner

FAST JOIN AND LEAVE VIRTUAL NETWORK

FIELD

The present disclosure relates to virtual networking in a multi-tenant processing environment and more particularly to virtual networking between virtual machines across computing systems in a multi-tenant processing environment.

BACKGROUND

In large-scale computing, an operator may provide computation and storage services to different entities (called tenants) using common hardware. For example, the data of multiple tenants may be stored in a single hard disk array or flash array, jobs from multiple tenants may access the same physical RAM resource, and multiple tenants may share one or more cores of a microprocessor. In addition, network traffic for multiple tenants may be carried across the same networking hardware, such as switches and routers.

To isolate these tenants from each other so that hostile or inadvertent actions by one cannot affect the other, various techniques are used. For example, virtualization may prevent tenants from directly interacting with hardware. An operator may instantiate virtual machines for multiple tenants on the same computing system, where the tenants share the compute and storage resources of that computing system via a hypervisor. The hypervisor keeps the tenants restricted to their own defined portions of the compute and storage resources. The hypervisor may be integrated with, or run on top of, an operating system such as the WINDOWS SERVER operating system from Microsoft Corporation.

To prevent the virtual machines of different tenants from being able to communicate with each other, the virtual machines may be grouped into Virtual Local Area Networks (VLANs). However, organizing virtual machines into VLANs requires configuring all the switches in the subnet. If this is done one time, the effort may be inconsequential. However, for dynamic tasks, where virtual machines may be reassigned frequently, these configuration changes may introduce substantial management burden, delays, and race conditions that affect packet routing and negatively impact usability, speed, and reliability.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system includes at least one processor and at least one computer-readable storage medium configured to store instructions for execution by the at least one processor. The instructions include, in response to receiving a job request that identifies a first tenant, obtaining a first virtual network key corresponding to the first tenant. The instructions include identifying a first computing system that has resources available to satisfy the job request. The instructions include transmitting a first command to the first computing system. The first command includes the first virtual network key, instructs the first computing system to assign a virtual machine to the job request, and instructs the first computing system to associate the first virtual network key with the assigned virtual machine. The instructions include, in response to completion of the job request, transmitting a second command to the first computing system. The second command instructs the first computing system to associate a default virtual network key with the assigned virtual machine. The default virtual network key does not correspond to the first tenant.

In other features, the instructions include, in response to the assigned virtual machine transmitting a first packet, encapsulating the first packet using the first virtual network key. The instructions include, in response to a second packet destined for the assigned virtual machine arriving at the first computing system, identifying an embedded virtual network key from the second packet; dropping the second packet in response to a failure to identify the embedded virtual network key; and dropping the second packet in response to the embedded virtual network key differing from the first virtual network key.

In other features, the instructions include identifying a set of computing systems including the first computing system that have resources available to satisfy the job request. The instructions include transmitting a set of commands including the first command to the set of computing systems, respectively. Each command of the set of commands includes the first virtual network key. In other features, the second command instructs the first computing system to reset the virtual machine to a predetermined state. In other features, the job request indicates a first subscriber identifier. The instructions include maintaining a one-to-one mapping between subscriber identifiers and virtual network keys. In other features, the default virtual network key does not correspond to any of the subscriber identifiers in the mapping.

In other features, the job request includes the first subscriber identifier and is received using a web-based Application Programming Interface (API) compliant with representational state transfer (REST). In other features, the instructions include, in response to the first subscriber identifier being missing from the mapping, creating a unique virtual network key and associating the unique virtual network key with the first subscriber identifier in the mapping. In other features, the job request includes an augmented structured query language (SQL) query. In other features, the first virtual network key is one of a Virtual Subnet Identifier (VSID) defined by Request for Comment (RFC) 7636, Network Virtualization using Generic Routing Encapsulation (NVGRE) and a segment ID defined by RFC 7348, Virtual eXtensible Local Area Network (VXLAN).

A method includes, in response to receiving a job request that identifies a first tenant, obtaining a first virtual network key corresponding to the first tenant. The method includes identifying a first computing system that has resources available to satisfy the job request. The method includes transmitting a first command to the first computing system. The first command includes the first virtual network key, instructs the first computing system to assign a virtual machine to the job request, and instructs the first computing system to associate the first virtual network key with the assigned virtual machine. The method includes, in response to completion of the job request, transmitting a second command to the first computing system. The second command instructs the first computing system to associate a default virtual network key with the assigned virtual machine. The default virtual network key does not correspond to the first tenant.

In other features, the method includes, in response to the assigned virtual machine transmitting a first packet, encapsulating the first packet using the first virtual network key. The method includes, in response to a second packet destined for the assigned virtual machine arriving at the first computing system: identifying an embedded virtual network key from the second packet; dropping the second packet in response to a failure to identify the embedded virtual network key; and dropping the second packet in response to the embedded virtual network key differing from the first virtual network key.

In other features, the method includes identifying a set of computing systems including the first computing system that have resources available to satisfy the job request. The method includes transmitting a set of commands including the first command to the set of computing systems, respectively. Each command of the set of commands includes the first virtual network key. In other features, the second command instructs the first computing system to reset the virtual machine to a predetermined state. In other features, the job request indicates a first subscriber identifier and the instructions include maintaining a one-to-one mapping between subscriber identifiers and virtual network keys. In other features, the default virtual network key does not correspond to any of the subscriber identifiers in the mapping.

In other features, the job request includes the first subscriber identifier and is received using a web-based Application Programming Interface (API) compliant with representational state transfer (REST). In other features, the method includes, in response to the first subscriber identifier being missing from the mapping, creating a unique virtual network key and associating the unique virtual network key with the first subscriber identifier in the mapping. In other features, the first virtual network key is one of a Virtual Subnet Identifier (VSID) defined by Request for Comment (RFC) 7636, Network Virtualization using Generic Routing Encapsulation (NVGRE) and a segment ID defined by RFC 7348, Virtual eXtensible Local Area Network (VXLAN).

A computer-readable storage medium that stores instructions including in response to receiving a job request that identifies a first tenant, obtaining a first virtual network key corresponding to the first tenant. The instructions include identifying a first computing system that has resources available to satisfy the job request. The instructions include transmitting a first command to the first computing system. The first command includes the first virtual network key, instructs the first computing system to assign a virtual machine to the job request, and instructs the first computing system to associate the first virtual network key with the assigned virtual machine. The instructions include, in response to completion of the job request, transmitting a second command to the first computing system. The second command instructs the first computing system to associate a default virtual network key with the assigned virtual machine. The default virtual network key does not correspond to the first tenant.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Introduction

Figure 1:
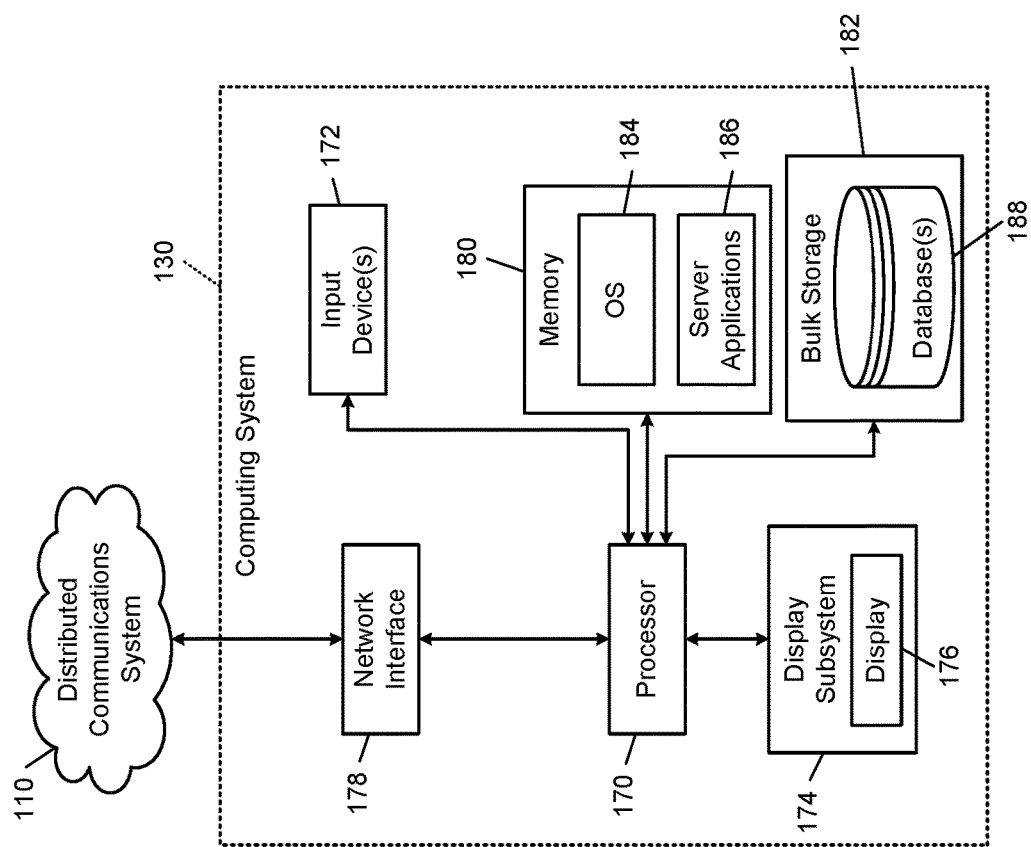
FIG. 1 is a functional block diagram of an example implementation of a computing system.

To isolate virtual machines in a multi-tenant computing environment so that different tenants cannot send network packets to each other, the present disclosure assigns a Virtual Network Key (VNK) to each tenant. When a virtual machine of a computing system is allocated to a tenant, the corresponding VNK is associated with that virtual machine in the networking subsystem of the computing system. The VNK is then used to encapsulate packets transmitted by the virtual machine. When those encapsulated packets arrive at their destination, the VNK in the encapsulated packet is compared to the VNK of the destination. The packet is decapsulated and delivered only if the VNK encoded in the packet matches the VNK of the destination virtual machine. Otherwise, the packet may be dropped.

The VNK may be a binary number of a fixed length. Principally, a VNK uniquely identifies a group of virtual machines that are permitted to communicate with each other. The uniqueness of the VNK is not global but is instead unique within the local area network (LAN), or within a set of LANs interconnected via a technology like a virtual private network (VPN).

By encapsulating packets from the virtual machines, and then using the physical IP addresses of the computing systems to route packets between the computing systems, network configurations, such as switching tables or routing tables, do not need to be updated when a virtual machine is allocated to a tenant. The VNK is transparent to, and out of the control and knowledge of, the tenant. In this way, virtual machines of the tenant can securely communicate with each other and with no other tenants.

When a virtual machine is deallocated, the VNK for that virtual machine may be reset to a default value. The default value may allow unallocated virtual machines to communicate with each other. In other implementations, the default value may prevent any packets from being sent and/or received by a virtual machine associated with the default VNK.

Using the above approach, virtual machines can join and leave the VNK-defined virtual network rapidly. In some implementations, joining or leaving a virtual network may be possible in under 10 milliseconds or even under 5 milliseconds. This is orders of magnitude faster than various prior art methodologies. Other benefits of the present disclosure are the ability to support many more tenant-specific virtual networks than when using a Virtual Local Area Network (VLAN). As defined by IEEE 802.1Q, the maximum number of VLANs is 4,094. Meanwhile, encapsulation technologies that can be used with the present disclosure may support 24-bit identifiers (IDs), allowing more than 16 million separate virtual networks.

A tenant is a customer or client of the computing environment and may be an internal customer—that is, a group within the same organization that operates the computing environment. In some implementations of the present disclosure, an organization may be able to register multiple tenant identities. For example, a retailer may register an identity for production purposes (such as dynamic inventory analytics) and another for development and testing purposes. These different tenant identities would then have different VNKs and be isolated from each other to prevent inadvertent cross-contamination. In other implementations, a single tenant identity may be used and each job invoked by that tenant can receive a different VNK. Therefore, a job related to testing may be isolated from a job related to obtaining data for a production system. For simplicity, the remainder of the description describes an implementation in which tenants correspond one-to-one to VNKs.

The present disclosure may use an encapsulation technique such as Network Virtualization using Generic Routing Encapsulation (NVGRE), as defined in Request For Comments (RFC) 7637. When using NVGRE, the VNK may be a 24-bit Virtual Segment Identifier (VSID). In another implementation, encapsulation may be performed using Virtual eXtensible Local Area Network (VXLAN), defined by RFC 7348. When VXLAN is used, the VNK may be a 24-bit Segment Identifier (ID) or 24-bit Network ID.

The present disclosure may be used with distributed processing systems where data is stored across a set of computing systems and where compute resources on those computing systems operate on the data. For example, a MapReduce system, such as the HADOOP processing system from the Apache Software Foundation, may rely on processing performed by virtual machines located in proximity to data to be processed. Data warehousing systems may be built on top of a MapReduce framework. For example, the HIVE data warehousing system from the Apache Software Foundation is built on HADOOP.

To manage, especially at large scale, MapReduce frameworks, a system such as the Yet Another Resource Negotiator (YARN) system from the Apache Software Foundation can be used. According to the YARN system, a node manager runs on each computing system and is responsible for allocating resource containers (such as virtual machines) in response to requests from an application master. The application master tracks which containers are operating on a job, and may ask for additional resources or retire resources whose work is complete.

A resource manager may track available nodes and active node managers. While the nomenclature of node manager, application manager, and resource manager will be used below, the present disclosure is not limited to MapReduce-style computing tasks. The present disclosure is applicable to any multi-tenant environment and may have particular efficiencies and advantages when virtual machines are allocated and deallocated on a dynamic basis.

One style of distributed processing tasks handled efficiently by the present disclosure may be U-SQL queries. In general terms, a U-SQL query allows a user to use syntax similar to a standard structured query language (SQL) query but specify custom input formats, output formats, and data processing operations. For example, the data processing operations may be specified in a general-purpose, object-oriented programming language, such as the C# language from Microsoft Corporation. The data processing operations may be pushed down to computing nodes where the data is stored, and then the processed data is collected to respond to the U-SQL query. A U-SQL query may be referred to generically as an augmented SQL query. An augmented SQL query substantially follows the format of a standard SQL query but includes a specification of at least one of a data ingest process, a data formatting process, a data processing process, and a data output process.

Example Computing System

A simplistic example of a computing system 130 in which the systems and methods of the present disclosure can be implemented is permitted. The terms application and computer program are to be understood broadly as representing machine-readable instructions executable by one or more computing devices.

A computing system 130 includes one or more processors 170, a network interface 178, memory 180, and bulk storage 182. In some implementations, the computing system 130 may be a general-purpose server and include one or more input devices 172 (e.g., a keypad, touchpad, mouse, and so on) and a display subsystem 174 including a display 176.

The network interface 178 connects the computing system 130 to a distributed communications system 110 which may include a local area network (LAN) and may also encompass a public or private wide area network (WAN). For example, the network interface 178 may include a wired interface (e.g., an Ethernet interface). The memory 180 may include volatile or nonvolatile memory, cache, or other type of memory. The bulk storage 182 may include flash memory, one or more magnetic hard disk drives (HDDs), or other bulk storage devices.

The processor 170 of the computing system 130 executes an operating system (OS) 184 and one or more server applications 186, which may be housed in a virtual machine hypervisor or containerized architecture. The bulk storage 182 may store one or more databases 188 that store data structures used by the server applications 186 to perform respective functions.

Virtual Machine Architecture

Figure 2:
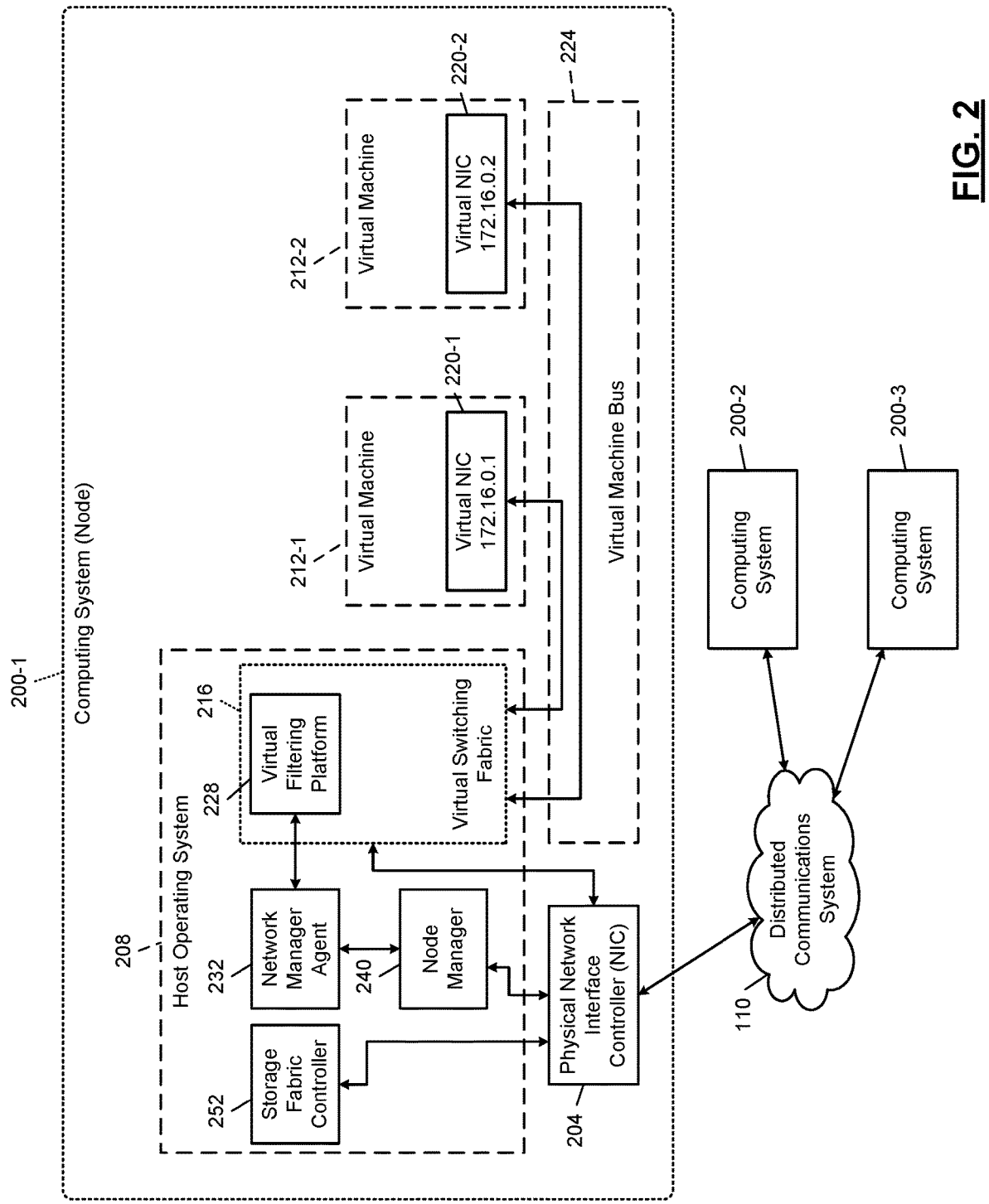
FIG. 2 is a functional block diagram of certain components related to hosting virtual machines in a computing system.

In FIG. 2, computing systems 200-1, 200-2, and 200-3 (collectively, computing systems 200) communicate via the distributed communication system 110. The distributed communications system 110 may include top-of-rack switches, end-of-row switches, aggregation switches, routers, etc. In various implementations, the computing systems 200 may be distributed across multiple data centers. The distributed communications system 110 uses Virtual Private Networks (VPNs) to route data between those of the computing systems 200 that are geographically separated. In some implementations, data in encrypted form may even be carried over the public internet. Each of the computing systems 200 may be referred to as a node and may be implemented as shown in FIG. 1.

The computing system 200-1 communicates with the distributed communication system 110 using a physical Network Interface Controller (NIC) 204. Though not shown, the computing system 200-1 may include additional physical NICs, such as when greater networking throughput may be needed. A host operating system 208, which may also be known as a host partition or parent partition, manages virtual machines 212-1 and 212-2 (collectively, virtual machines 212). The virtual machines 212 may be referred to as child partitions or guest operating systems.

The host operating system 208 may execute a hypervisor that controls the virtual machines 212. In other implementations, the host operating system 208 integrates hypervisor functionality. For the below discussion, functionality of the hypervisor is described as part of the host operating system 208 even though in certain implementations that functionality is not intrinsic to the host operating system 208 and is instead part of a hypervisor application. The host operating system 208 manages the virtual machines 212, including instantiating a new virtual machine from an image, resetting a virtual machine to a snapshot, and deactivating a virtual machine.

At any particular time, the computing system 200-1 may have any number of virtual machines, even zero. In various implementations, the host operating system 208 may provision a predetermined number of virtual machines that are simply idled when not in use. Further, once a job for which the virtual machine was providing computation is completed, the virtual machine may be returned to a predetermined state, such as by using a snapshot.

The virtual machines 212 communicate with a virtual switching fabric 216 of the host operating system 208 via virtual NICs 220-1 and 220-2 (collectively, virtual NICs 220). The virtual NICs 220 present a standard NIC interface to the operating system of the virtual machine and communicate with the virtual switching fabric 216 via a virtual machine bus 224. As examples only, the Internet Protocol (IP) addresses of the virtual NICs 220 are 172.16.0.1 and 172.16.0.2, respectively. These IP addresses may be unique only within the scope of the computing system 200-1. The virtual switching fabric 216 routes networking traffic (generally, packets) among the virtual NICs 220 and the physical NIC 204.

A virtual filtering platform 228 may be implemented as part of the virtual switching fabric 216 or may be separate from but in communication with the virtual switching fabric 216. As described in more detail below, the virtual filtering platform 228 may encapsulate packets from the virtual NICs 220 for transmission over the distributed communications system 110 and may selectively decapsulate or drop packets destined for the virtual machines 212. The virtual filtering platform 228 may also perform a variety of other filtering and routing procedures, which may be defined by a set of rules.

A network manager agent 232 controls the virtual filtering platform 228, including providing a Virtual Network Key (VNK) used for encapsulating packets from the virtual NICs 220. The network manager agent 232 may also control the IP and medium access control (MAC) addresses of the virtual machines 212.

A node manager 240 is designed to assign computation and management jobs to the virtual machines 212. For example, the node manager 240 may assign administrative responsibility for a particular compute job to the virtual machine 212-2 and then, in response to a request from the administrative agent in the virtual machine 212-2, the node manager 240 may assign a compute task to the virtual machine 212-1.

In various implementations, the computing systems 200 may be configured to not only have compute resources such as virtual machines but also to have storage resources. For example, data from various customers (or, tenants) may be distributed across the computing systems 200. A storage fabric controller 252 of the host operating system 208 may manage the data stored on the computing system 200-1. For example, the storage fabric controller 252 may maintain indices of the stored data, may synchronize the stored data with other storage fabric controllers, and may manage redundancy of the stored data to reduce the risk of data loss. The storage fabric controller 252 may store data according to the HADOOP distributed file system (HDFS).

In various implementations, portions of a single tenant's data may be distributed across the computing systems 200. Then, when a particular portion of the data will be used for computation, a compute resource located on the same one of the computing systems 200 as the data can be used. In situations where the node manager of one of the computing systems 200 has already assigned all of the virtual machines to other tasks, a computing system within the same physical rack may be used to minimize latency. If there are no available virtual machines in the rack, then another rack separated by a minimum number of networking hops may be chosen to host the compute task.

Job Request Processing

Figure 3A:
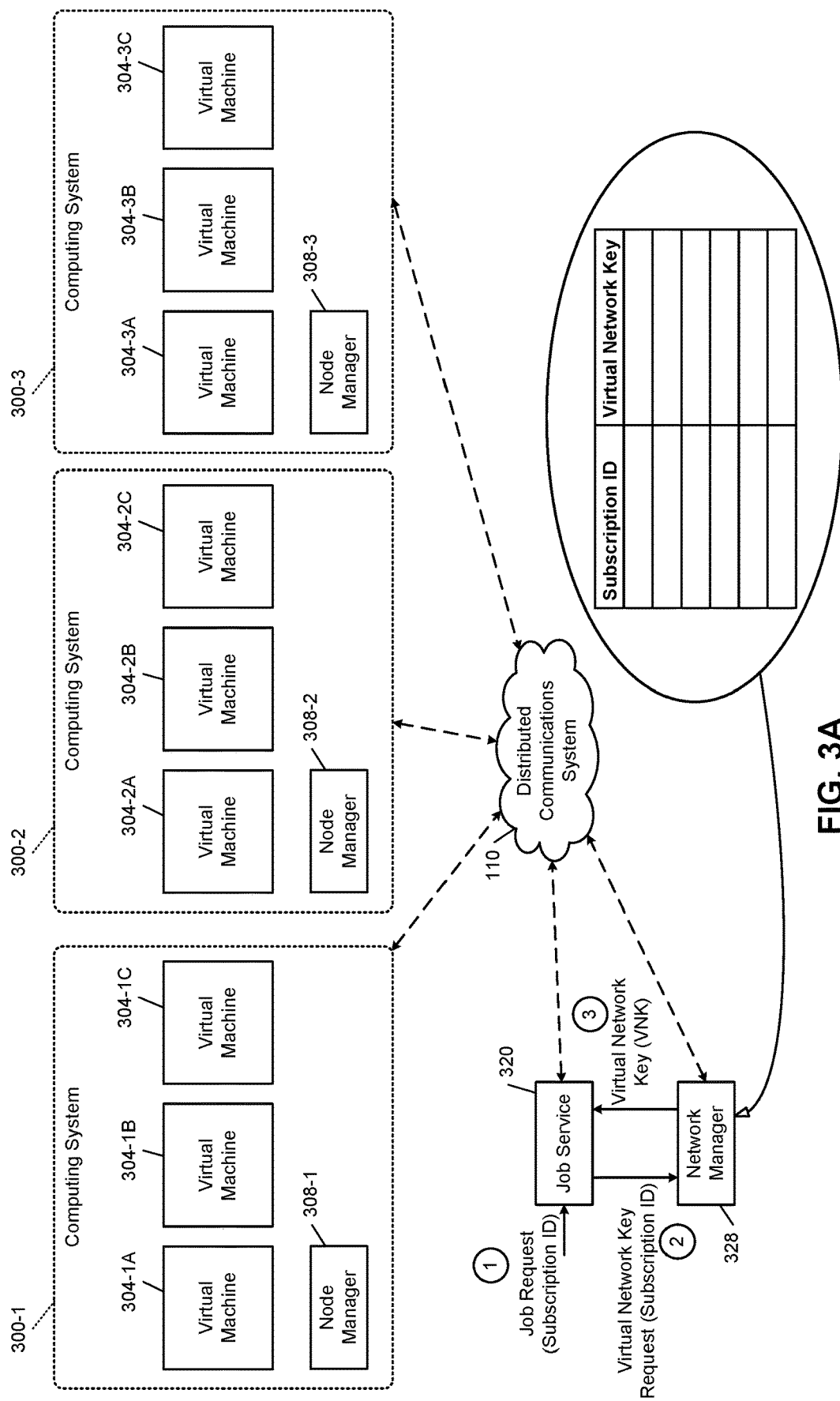
FIG. 3A is a functional data flow diagram showing job request processing.

In FIG. 3A, three example computing systems 300-1, 300-2, and 300-3 (collectively, computing systems 300) are in communication over the distributed communication system 110. Each of the computing systems 300 is shown with three virtual machines. For example, the computing system 300-1 includes virtual machines 304-1A, 304-1B, and 304-1C (collectively, virtual machines 304-1). Each of the computing systems 300 may also include a node manager 308, respectively. Although each of the computing systems 300 is shown with three virtual machines 304, the number of virtual machines in each of the computing systems 300 may be different and may vary over time. The maximum number of virtual machines 304 in a computing system may be set according to hardware characteristics of the computing system, such as the number of processor cores.

A job service 320 receives a job request indicated in FIG. 3A by a one in a circle. A job request includes or indicates a subscription ID related to the job request. For example, a subscription ID may indicate the customer or tenant that submitted the job request. In various implementations, the job request may be sent using a web-based application programming interface (API) compliant with representational state transfer (REST)—that is, a RESTful API.

The job service 320 transmits a request for a Virtual Network Key (VNK) to a network manager 328. The VNK request indicates the subscription ID associated with the job request. Based on the subscription ID, the network manager 328 provides a VNK to the job service 320. As indicated by dashed lines in FIG. 3A, the actual network communications between the computing systems 300, the job service 320, and the network manager 328 traverse the distributed communications system 110. However, the exchange of data is shown for simplicity with solid lines. The Network Manager may maintain a mapping from subscription ID to VNK. This mapping may be stored as rows in a relational database or may be stored in a defined data structure, such as a B-tree or a linked list.

The network manager 328 may generate a new VNK for each subscription ID that has not yet been encountered. In other words, the network manager 328 may not have a prepopulated mapping from all subscription IDs to VNKs—instead, the VNK is generated the first time the subscription ID is used in a job request. The network manager 328 may include an expiration field indicating the time after which the VNK for the subscription ID is deleted. For example, if no job requests have been received for a certain subscription ID after 24 hours, that entry may be removed from the mapping.

Figure 3B:
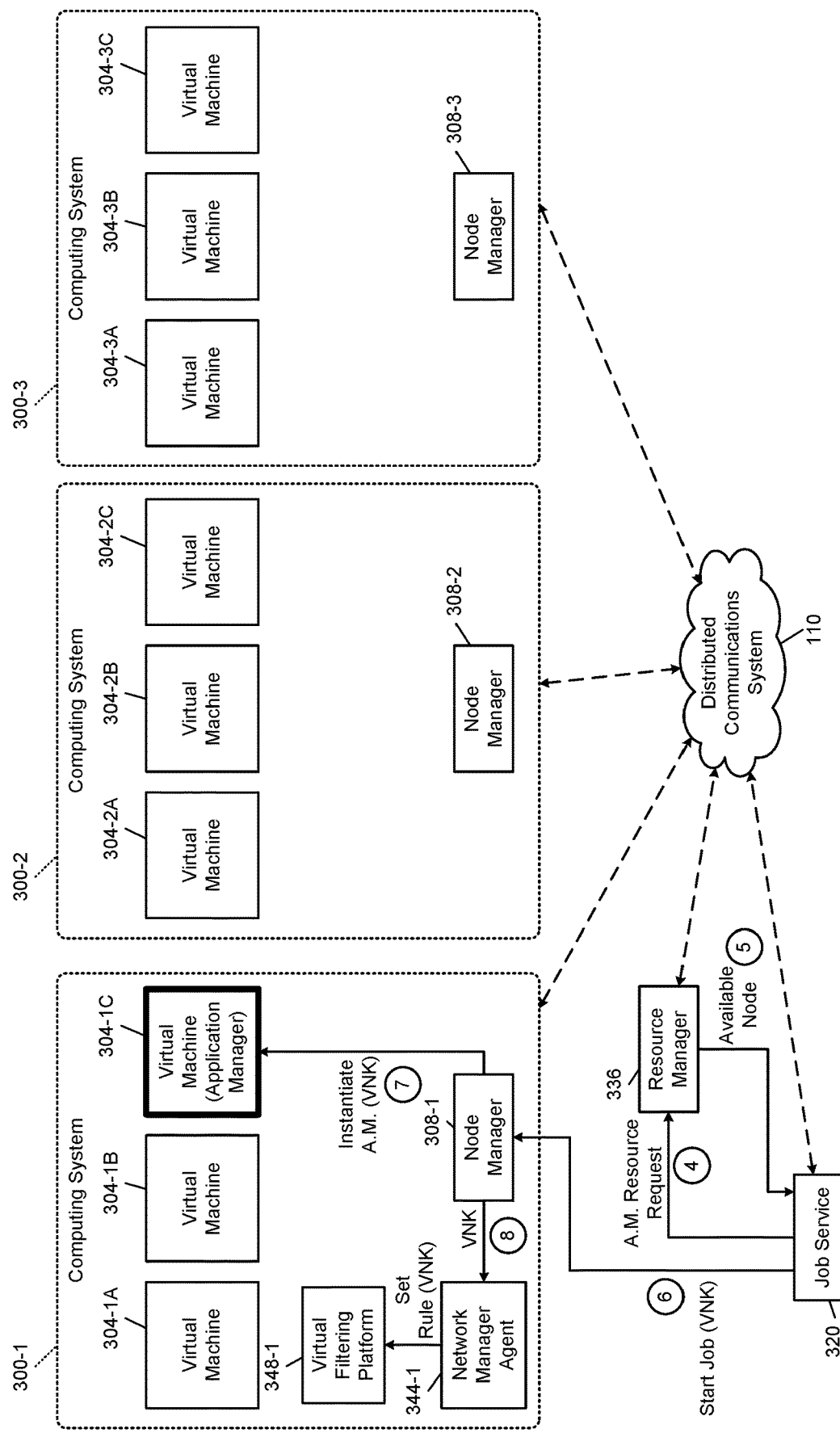
FIG. 3B is a functional data flow diagram depicting application manager instantiation and filtering rule setting related to a job request.

In FIG. 3B, the job service 320 sends an application manager resource request to a resource manager 336. The resource manager 336 identifies an available node from among the computing systems 300 and provides an indication of the available node to the job service 320. The job service 320 then sends a start job instruction to the available node. In the example shown, the available node is the computing system 300-1 so the job service 320 sends the start job instruction to the node manager 308-1. The start job instruction includes the VNK associated with the tenant who sent the job request.

The node manager 308-1 then selects an available virtual machine and instantiates an application manager on the available virtual machine. In this case, the node manager 308-1 identifies that the virtual machine 304-1C is available and will therefore operate as the application manager. The node manager 308-1 also provides the VNK to the network manager agent 344 of the computing system 300-1.

The network manager agent 344 sets a rule in a virtual filtering platform 348 of the computing system 300-1 to associate the VNK with the virtual machine 304-1C. As described in more detail below, the virtual filtering platform 348 will then encapsulate packets from the virtual machine 304-1C using the VNK. In addition, the virtual filtering platform 348 will only deliver encapsulated packets to the virtual machine 304-1C if the VNK set in the encapsulated packet matches the VNK of the virtual machine 304-1C.

Although instantiating the application manager is labeled with a circled 7 and providing the VNK to the network manager agent 344 is labeled with a circled 8, these operations can be performed in either order or simultaneously. The network manager 328 of FIG. 3A, the job service 320, and the resource manager 336 may each be implemented in a separate computing system, such as instances of the computing system 130 of FIG. 1. In various implementations, a single computing system may perform the role of multiple ones of the job service, the network manager 328, and the resource manager 336.

Figure 3C:
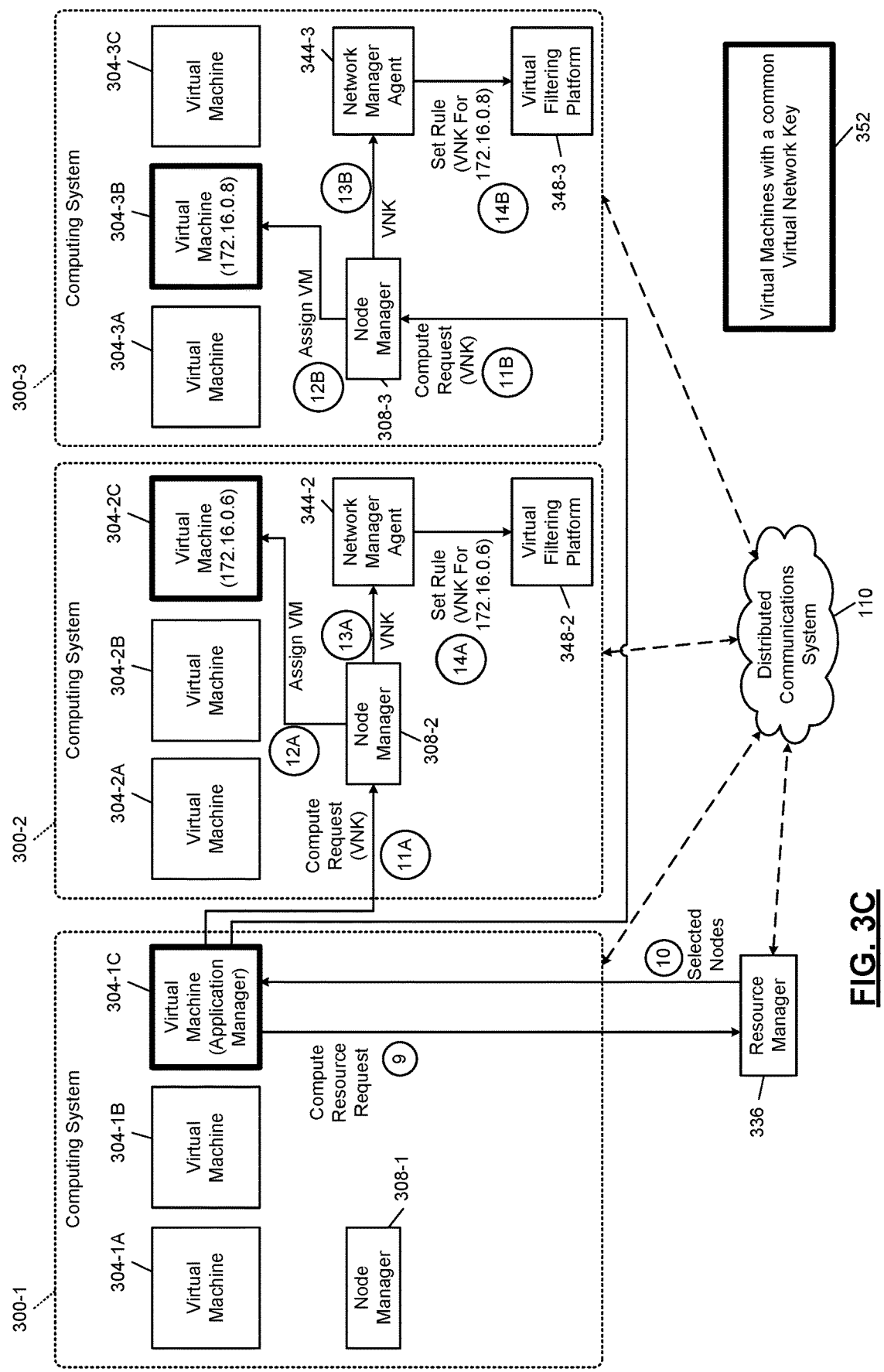
FIG. 3C is a functional data flow diagram showing multiple compute requests initiated by an application manager.

In FIG. 3C, the application manager executing on the virtual machine 304-1C determines how many computing resources are needed for the job and transmits a compute resource request to the resource manager 336. The resource manager 336 responds with a list of selected nodes. The application manager in the virtual machine 304-1C then transmits compute requests to the selected nodes. As an example only, the selected nodes are the computing systems 300-2 and 300-3.

The application manager of the virtual machine 304-1C transmits compute requests, including the VNK, to the node manager 308-2 and the node manager 308-3 because they are associated with the computing systems 300-2 and 300-3 that include the selected nodes. Because these compute requests may be sent in parallel, they are labeled with circled 11A and 11B. Similarly, the operations of the node manager 308-2 and 308-3 may operate in parallel and are therefore labeled with A's and B's. The following discussion will describe the node manager 308-2, and the node manager 308-3 will operate similarly.

The node manager 308-2 assigns the virtual machine 304-2C to the job, causing the virtual machine 304-2C to initiate a compute task. The node manager 308-2 also provides the VNK to a network manager agent 344-2 of the computing system 300-2. The network manager agent 344-2 sets a rule to associate the VNK with the virtual machine 304-2C using a virtual filtering platform 348-2 of the computing system 300-2.

As an example only, the virtual machine 304-2C is assigned the IP address 172.16.0.6, which may be controlled by the network manager agent 344-2. The virtual filtering platform 348-2 may include a mapping from IP address to VNK or from MAC address to VNK. The virtual filtering platform 348-2 therefore knows which of the virtual machines 304-2 are associated with which VNK. As indicated by a legend 352, the virtual machines with a thick border are now all associated with a common VNK.

Figure 4A:
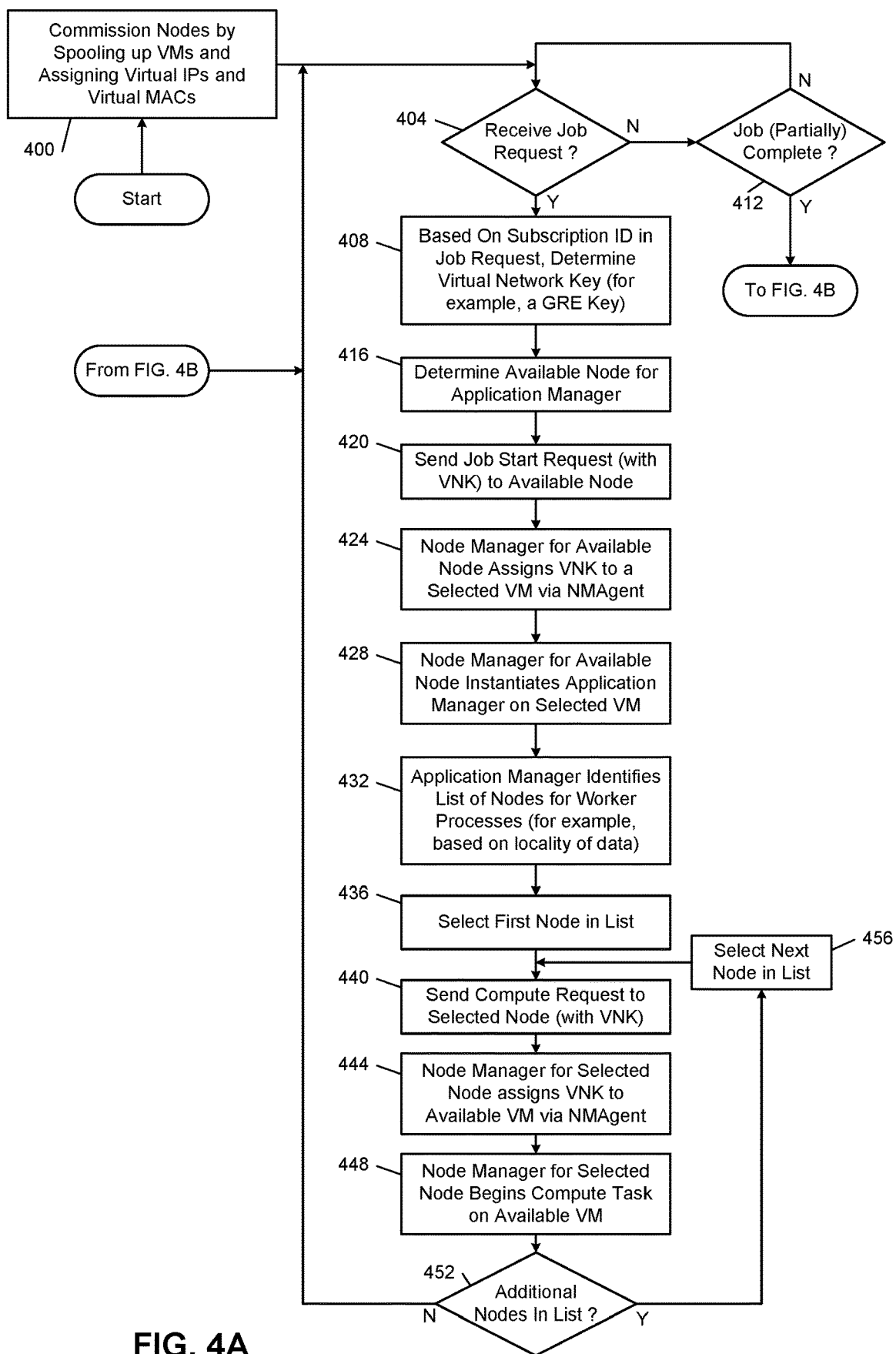
FIGS. 4A and 4B together are a flowchart of example job processing operations.

In FIG. 4A, a flowchart of job control operations, such as might be performed by the blocks shown in FIGS. 3A, 3B, and 3C, is shown. Control begins at 400, where nodes are commissioned by spooling up virtual machines within computing systems and assigning virtual networking addresses. The virtual networking addresses may include virtual Internet Protocol (IP) addresses and virtual medium access control (MAC) addresses.

Control continues at 404 where, if a job request has been received, control transfers to 408; otherwise, control transfers to 412. At 408, based on the subscription ID indicated by the job request, control determines a Virtual Network Key (VNK). For example, the VNK may be a Generic Routing Encapsulation (GRE) tunnel key or a Virtual eXtensible Local Network (VXLAN) Segment Identifier (ID).

For example, a one-to-one mapping from subscription ID to VNK may be maintained. If a subscription ID is missing from the mapping, a unique VNK is generated for the subscription ID and added to the mapping. The unique VNK may be generated by incrementing the last-created VNK or by randomly selecting, without replacement, a VNK from the space of possible VNKs. For example, a random function may be invoked o select a new VNK, and if the new VNK is already in the mapping, the random function is invoked again.

Control continues at 416, where control determines an available node for the application manager. At 420, control sends a job request with the VNK from 408 to the determined available node. At 424, the node manager at the determined available node assigns the VNK to a selected virtual machine via a network manager agent. At 428, the node manager at the available node instantiates the application manager on the selected virtual machine.

At 432, the application manager identifies a list of nodes for worker (or, compute) processes. For example, each node may be selected based on its proximity to the data the node will process. For example, selection may prefer a node in the same computing system as a majority or all of the data to be processed. If the same computing system does not have any available virtual machines, a node within the same rack may be chosen to minimize latency between the virtual machine and the data. At 436, control selects the first node in the list and continues at 440.

At 440, control sends a compute request to the selected node and includes the VNK. At 444, the node manager at the selected node assigns the VNK to the available virtual machine via a network manager agent on the selected node. At 448, the node manager for the selected node begins a compute task on the available virtual machine. At 452, control determines whether there are any additional nodes in the list. If so, control transfers to 456; otherwise, control returns to 404. At 456, control selects the next node in the list and continues at 440.

Figure 4B:
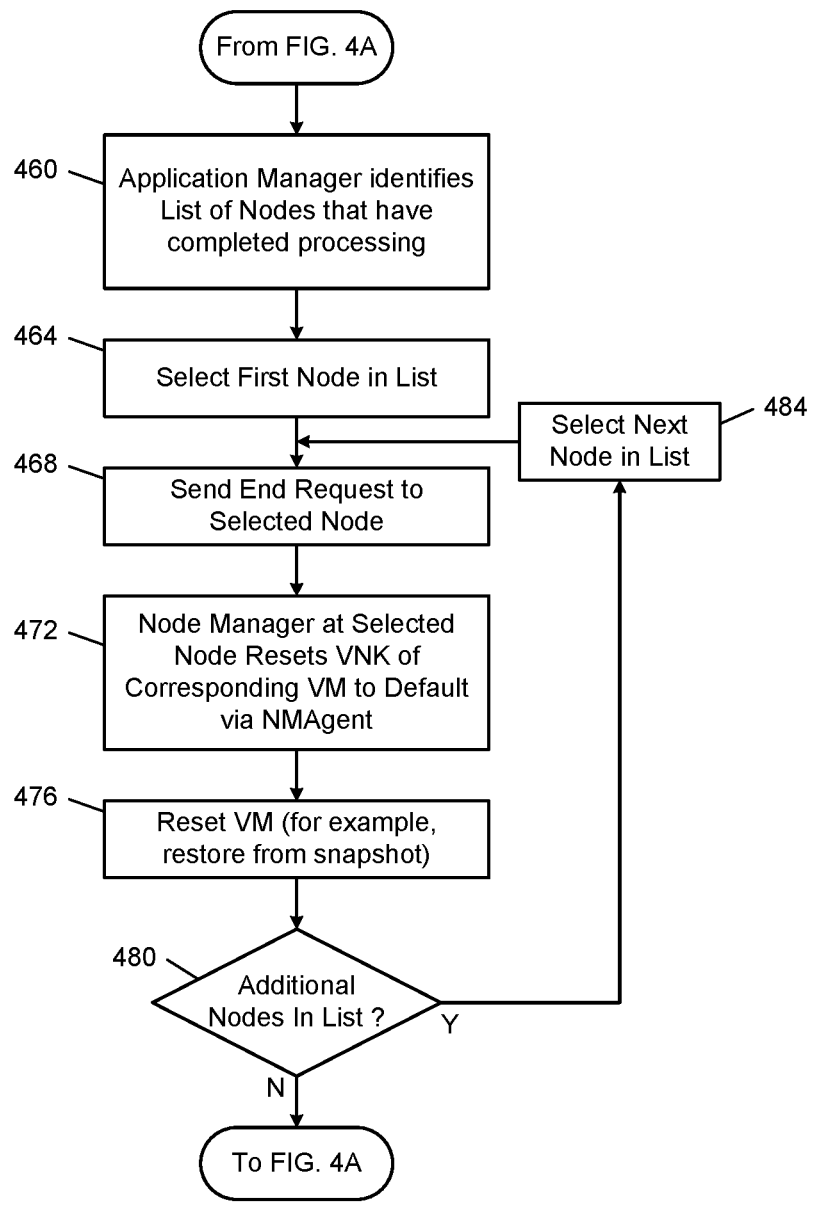

At 412, if a job is at least partially complete, control transfers to FIG. 4B; otherwise, control returns to 404. In FIG. 4B, control begins at 460, where the application manager identifies a list of nodes that have completed processing. At 464, control selects the first node in the list. At 468, control sends an end request to the selected node.

At 472, the node manager at the selected node resets the VNK of the corresponding virtual machine to a default value via the network manager agent. At 476, control resets the virtual machine, such as by restoring the virtual machine from a snapshot. At 480, control determines whether there are additional nodes in the list. If so, control transfers to 484; otherwise, control returns to 404 in FIG. 4A. At 484, control selects the next node in the list and continues at 468.

Figure 5:
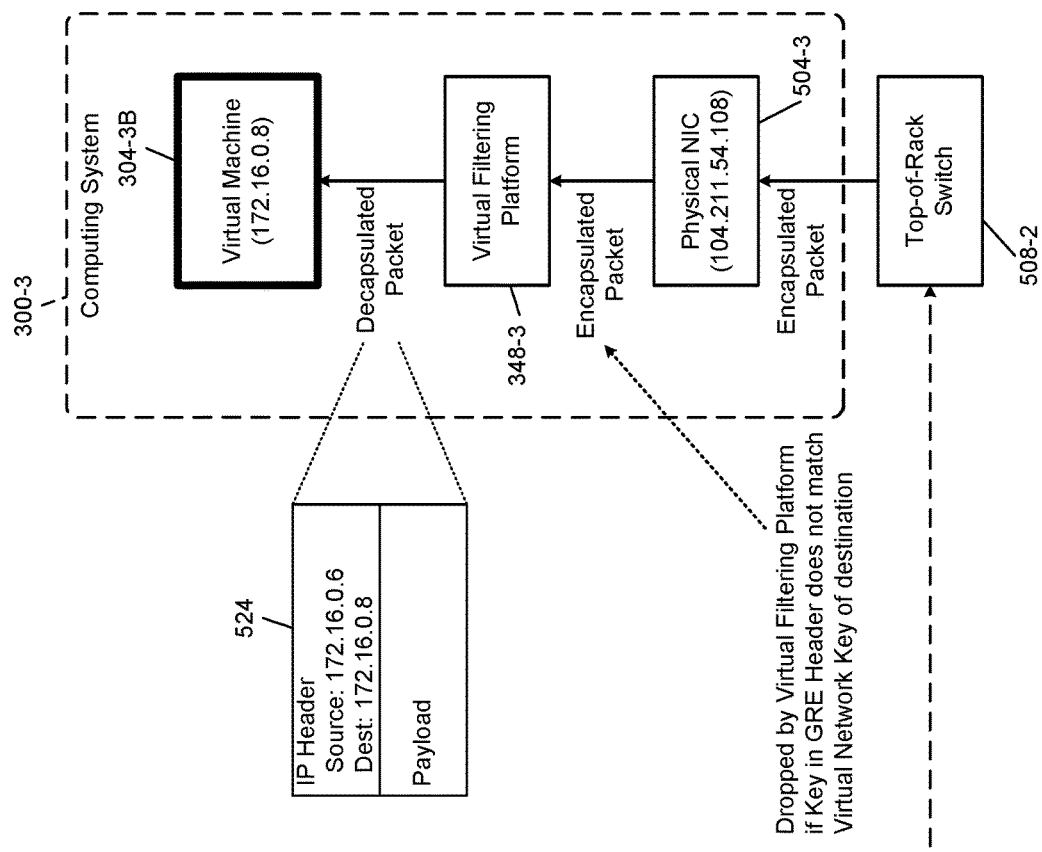
FIG. 5 is a functional data flow diagram of virtual machine communication across computing systems.
Figure 5:
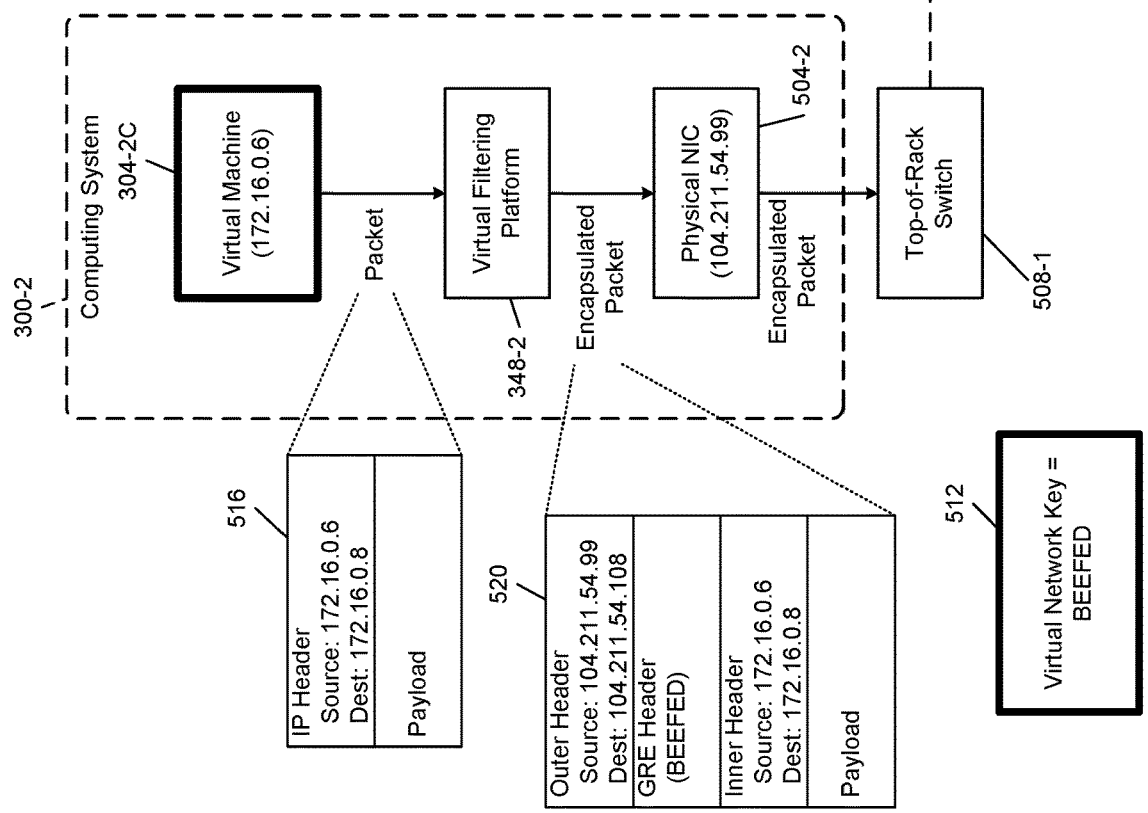

In FIG. 5, selected components of the computing system 300-2 and the computing system 300-3 are shown to illustrate an example transmission of a packet from one virtual machine to another. The computing systems 300-2 and 300-3 include physical NICs 504-2 and 504-3, respectively. As examples only, the IP addresses of the physical NICs 504-2 and 504-3 are 104.211.54.99 and 104.211.54.108, respectively. Again, as an example only, the computing system 300-2 and the computing system 300-3 are located in separate equipment racks and therefore communicate via top-of-rack switches 508-1 and 508-2, respectively.

As further example data, the virtual machines 304-2C and 304-3B have virtual IP addresses of 172.16.0.6 and 172.16.0.8, respectively. In addition, the virtual machines 304-2C and 304-3B are associated with a VNK of 0xBEEFED in hexadecimal. While this VNK is 24-bit, the VNK in various implementations may have greater or fewer bits. Legend 512 indicates that the thick border corresponds to this VNK.

When the virtual machine 304-2C sends a packet 516 to the virtual machine 304-3B, the packet includes an IP header, including source and destination IP addresses, and a payload. The virtual filtering platform 348-2 encapsulates the packet 516 to create an encapsulated packet 520. The encapsulated packet 520 maintains the inner header and payload and adds an outer routing header including source and destination IP addresses.

In addition, the encapsulated packet 520 includes an encapsulation header. For example, the header may be formatted according to the Generic Routing Encapsulation (GRE) specification in RFC 1701 or RFC 2784, which may be extended by RFC 2890. The encapsulation header will include the VNK that the virtual filtering platform 348-2 has been told is associated with the virtual machine 304-2C. The physical NIC 504-2 sends the encapsulated packet to the top-of-rack switch 508-2, which directly or indirectly sends the encapsulated packet to the top-of-rack switch 508-2.

The physical NIC 504-3 forwards the encapsulated packet from the top-of-rack switch 508-2 to the virtual filtering platform 348-3. The virtual filtering platform 348-3 compares the VNK in the encapsulated packet (in this case, 0xBEEFED) to the VNK associated with the virtual machine 304-3B (in this case, also 0xBEEFED). If the VNKs do not match, the virtual filtering platform 348-3 drops the encapsulated packet. Otherwise, the virtual filtering platform 348-3 strips off the outer header and encapsulation header and provides the original inner packet 524 to the virtual machine 304-3B. From the perspective of the virtual machines 304-2C and 304-3B, the VNK is unknown, the encapsulation is transparent, and the fact that communication is happening via a virtual network topology rather than a physical network topology is also transparent.

Figure 6:
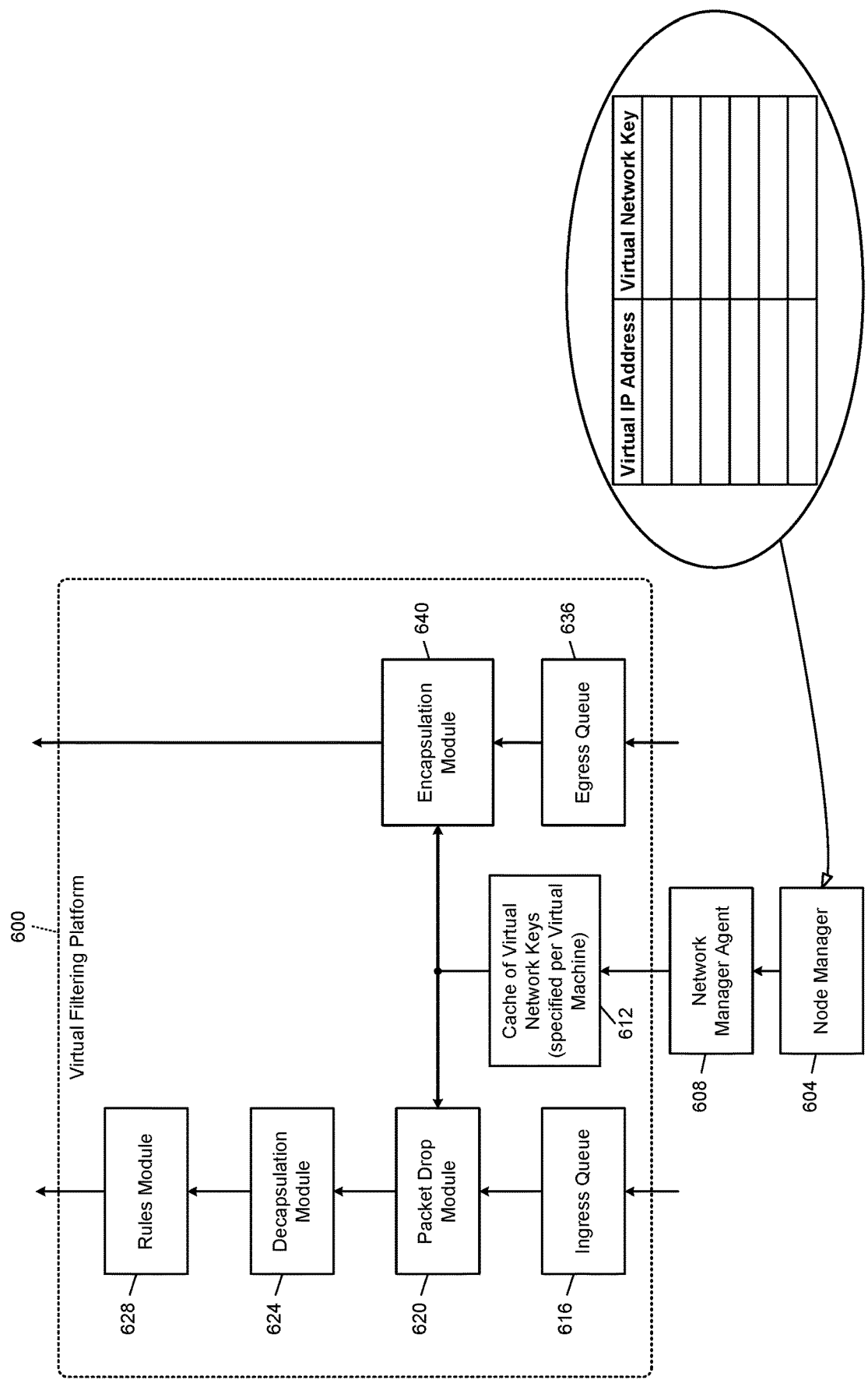
FIG. 6 is a functional block diagram of an example implementation of a virtual filtering platform.

In FIG. 6, a functional block diagram of a virtual filtering platform 600 is shown. For example, the virtual filtering platforms 348-2 and 348-3 of FIG. 5 may be implemented as shown in FIG. 6. A node manager 604 maintains a mapping of virtual IP addresses to VNKs. In various implementations, the node manager 604 may maintain that mapping only for virtual machines in the same computing system. In other limitations the node manager 604 may store a mapping for all virtual IP addresses and their corresponding VNKs.

The node manager 604 provides this mapping to a network manager agent 608 for virtual machines in the same computing system. The network manager agent 608 may set virtual IP and virtual MAC addresses for each virtual machine. The network manager agent 608 may also establish rules for the virtual filtering platform 600. One rule may be the assignment of a VNK to a virtual IP address. The virtual filtering platform 600 maintains a cache 612 of VNKs, one for each virtual machine. These may be persisted until new values are received from the network manager agent 608.

In various implementations, the virtual filtering platform 600 receives a packet destined for one of the virtual machines at an ingress queue 616. A packet drop module 620 determines whether to drop packets from the ingress queue 616. One rule may be to drop any encapsulated packets whose VNK does not match the VNK of the destination virtual machine. A decapsulation engine 624 decapsulates packets that were not dropped by the packet drop module 620. A rules engine 628 applies additional rules to the decapsulated packet, such as dropping packets that meet certain criteria or forwarding the packet to other destinations. An egress queue 636 receives packets sent by one of the virtual machines.

An encapsulation module 640 encapsulates packets from the egress queue 636 according to the VNK associated with the source virtual module and outputs the encapsulated packet toward the packet's destination. If the encapsulated packet's destination is in the same computing system, the packet may arrive back at the ingress queue 616.

Figure 7:
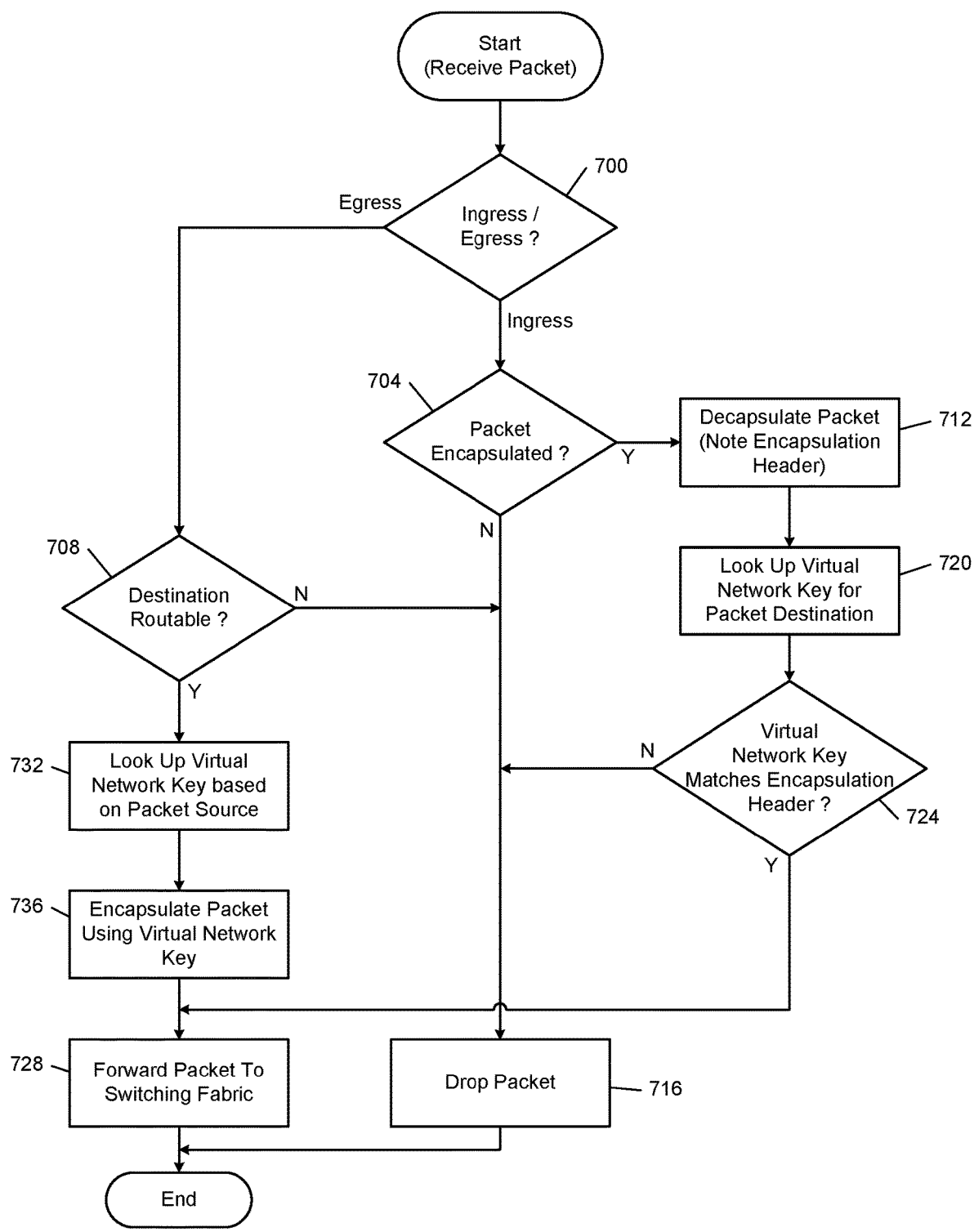
FIG. 7 is a flowchart showing example operation of a virtual filtering platform.

In FIG. 7, a flowchart shows example operation of a virtual filtering platform. Control begins at 700 when a packet is received. If the packet is an ingress packet (sent to the virtual machines), control transfers to 704. If the packet is an egress packet (sent by the virtual machines), control transfers to 708. At 704, control determines whether the packet is encapsulated. If so, control transfers to 712; otherwise, control transfers to 716, where the packet is dropped and control ends.

At 712, control decapsulates the packet and takes note of the encapsulation header. For example, control may record the VNK contained in the encapsulation header. At 720, control looks up the VNK for the packet destination. At 724, control determines whether the VNK looked up for the packet destination matches the VNK from the encapsulation header. If so, control transfers to 728; otherwise, control transfers to 716. At 728, control forwards the packet to the switching fabric for delivery to the destination and control ends.

At 708, control determines whether the destination address is routable—in other words, whether the virtual IP address specified in the destination of the packet maps to a physical destination IP address. If the destination is routable, control transfers to 732; otherwise, control transfers to 716. At 732, control looks up the VNK based on the packet source. At 736, control encapsulates the packet using the VNK associated with the packet source. Control then continues at 728.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable storage medium. The term computer-readable storage medium, as used herein, does not encompass transitory electrical or electromagnetic signals propagating on a carrier wave. Non-limiting examples of a computer-readable storage medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one computer-readable storage medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

The invention claimed is:

1. A system comprising:
at least one processor; and at least one computer-readable storage medium configured to store instructions for execution by the at least one processor, wherein the instructions include:
in response to receiving a job requests of a plurality of job requests invoked from a tenant, obtaining a first virtual network key corresponding to the job request, each of the plurality of job requests having different virtual network keys associated therewith;
identifying a first computing system that has resources available to satisfy the job request;
transmitting a first command to the first computing system, wherein the first command:
includes the first virtual network key,
instructs the first computing system to assign a virtual machine to the job request, and
instructs the first computing system to associate the first virtual network key with the assigned virtual machine; and
in response to completion of the job request, transmitting a second command to the first computing system, wherein:
the second command instructs the first computing system to assign a default virtual network key with the assigned virtual machine, the default virtual network key preventing any packets from being sent and/or received by the assigned virtual machine.

2. The system of claim 1 wherein the instructions include:
in response to the assigned virtual machine transmitting a first packet, encapsulating the first packet using the first virtual network key; and
in response to a second packet destined for the assigned virtual machine arriving at the first computing system:
identifying an embedded virtual network key from the second packet;
dropping the second packet in response to a failure to identify the embedded virtual network key; and
dropping the second packet in response to the embedded virtual network key differing from the first virtual network key.

3. The system of claim 1 wherein the instructions include:
identifying a set of computing systems including the first computing system that have resources available to satisfy the job request; and
transmitting a set of commands including the first command to the set of computing systems, respectively,
wherein each command of the set of commands includes the first virtual network key.

4. The system of claim 1 wherein the second command instructs the first computing system to reset the virtual machine to a predetermined state.

5. The system of claim 1 wherein:
the job request indicates a first subscriber identifier; and
the instructions include maintaining a one-to-one mapping between subscriber identifiers and virtual network keys.

6. The system of claim 5 wherein the default virtual network key does not correspond to any of the subscriber identifiers in the mapping.

7. The system of claim 5 wherein the job request:
includes the first subscriber identifier; and
is received using a web-based Application Programming Interface (API) compliant with representational state transfer (REST).

8. The system of claim 5 wherein the instructions include, in response to the first subscriber identifier being missing from the mapping, creating a unique virtual network key and associating the unique virtual network key with the first subscriber identifier in the mapping.

9. The system of claim 1 wherein the virtual network key enables VMs with the virtual network key to communicate with one another.

10. The system of claim 1 wherein the first virtual network key is one of:
a Virtual Subnet Identifier (VSID) defined by Request for Comment (RFC) 7636, Network Virtualization using Generic Routing Encapsulation (NVGRE), and a segment ID defined by RFC 7348, Virtual eXtensible Local Area Network (VXLAN).

11. A method comprising:
in response to receiving a job request of a plurality of job requests invoked from a tenant, obtaining a first virtual network key corresponding to the job request, each of the plurality of job requests having different virtual network keys associated therewith;
identifying a first computing system that has resources available to satisfy the job request;
transmitting a first command to the first computing system, wherein the first command:
includes the first virtual network key,
instructs the first computing system to assign a virtual machine to the job request, and
instructs the first computing system to associate the first virtual network key with the assigned virtual machine; and
in response to completion of the job request, transmitting a second command to the first computing system, wherein:
the second command instructs the first computing system to assign a default virtual network key with the assigned virtual machine, the default virtual network key preventing any packets from being sent and/or received by the assigned virtual machine.

12. The method of claim 11 further comprising:
in response to the assigned virtual machine transmitting a first packet, encapsulating the first packet using the first virtual network key; and
in response to a second packet destined for the assigned virtual machine arriving at the first computing system:
identifying an embedded virtual network key from the second packet;
dropping the second packet in response to a failure to identify the embedded virtual network key; and
dropping the second packet in response to the embedded virtual network key differing from the first virtual network key.

13. The method of claim 11 further comprising:
identifying a set of computing systems including the first computing system that have resources available to satisfy the job request; and
transmitting a set of commands including the first command to the set of computing systems, respectively,
wherein each command of the set of commands includes the first virtual network key.

14. The method of claim 11 wherein the second command instructs the first computing system to reset the virtual machine to a predetermined state.

15. The method of claim 11 wherein:
the job request indicates a first subscriber identifier; and
the instructions include maintaining a one-to-one mapping between subscriber identifiers and virtual network keys.

16. The method of claim 15 wherein the default virtual network key does not correspond to any of the subscriber identifiers in the mapping.

17. The method of claim 15 wherein the job request:
includes the first subscriber identifier; and
is received using a web-based Application Programming Interface (API) compliant with representational state transfer (REST).

18. The method of claim 15 further comprising, in response to the first subscriber identifier being missing from the mapping, creating a unique virtual network key and associating the unique virtual network key with the first subscriber identifier in the mapping.

19. The method of claim 11 wherein the first virtual network key is one of:
a Virtual Subnet Identifier (VSID) defined by Request for Comment (RFC) 7636, Network Virtualization using Generic Routing Encapsulation (NVGRE), and
a segment ID defined by RFC 7348, Virtual eXtensible Local Area Network (VXLAN).

20. A computer-readable storage medium that stores instructions comprising:
in response to receiving a job request of a plurality of job requests invoked from a tenant, obtaining a first virtual network key corresponding to the job requests, each of the plurality of job requests having different virtual network keys associated therewith;
identifying a first computing system that has resources available to satisfy the job request;
transmitting a first command to the first computing system, wherein the first command:
includes the first virtual network key,
instructs the first computing system to assign a virtual machine to the job request, and
instructs the first computing system to associate the first virtual network key with the assigned virtual machine; and
in response to completion of the job request, transmitting a second command to the first computing system, wherein:
the second command instructs the first computing system to assign a default virtual network key with the assigned virtual machine, the default virtual network key preventing any packets from being sent and/or received by the assigned virtual machine.

* * * * *